(12) United States Patent
    Trainin et al.

(10) Patent No.: US 8,561,031 B2
(45) Date of Patent: *Oct. 15, 2013

(54) SYNCHRONIZATION COVERAGE IN LOGIC CODE

(75) Inventors: Ehud Trainin, Michmanim (IL); Rachel Tzoref, Haifa (IL); Aviad Zlotnick, Mizpeh Netofah (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,727

(22) Filed: Sep. 12, 2012

(65) Prior Publication Data

US 2013/0014087 A1    Jan. 10, 2013

Related U.S. Application Data

(63) Continuation of application No. 12/636,795, filed on Dec. 14, 2009.

(51) Int. Cl.
    *G06F 9/44*    (2006.01)

(52) U.S. Cl.
    USPC ............................................ 717/127; 717/124

(58) Field of Classification Search
    None
    See application file for complete search history.

(56) References Cited

U.S. PATENT DOCUMENTS

| 6,269,478 B1 * | 7/2001 | Lautenbach-Lampe et al. ............................ 717/127 |
| 7,987,452 B2 * | 7/2011 | Kronlund et al. ............. 717/127 |
| 2009/0204948 A1 * | 8/2009 | Krauss .......................... 717/127 |
| 2010/0057965 A1 * | 3/2010 | Nir-Buchbinder et al. ... 710/200 |

OTHER PUBLICATIONS

Eitan Farchi et al.; Concurrent Bug Patterns and How to Test Them; 2003; IBM Research Lab in Haifa, Israel; ftp://ftp.cs.umanitoba.ca/pub/IPDPS03/Data/W20_PADTD_02.PDF.*
Elena sherman et al., "saturation=based testing of concurrent programs", 2009.
Mayur Naik, "A Randomized Dynamic Program Analysis Technique for Detecting Real Deadlocks", 2009.
Lu, S.; Park, S.; Seo, E. & Zhou, Y. "Learning from mistakes: a comprehensive study on real world concurrency bug characteristics", SIGPLAN Notices, ACM, 2008, 43, 329-339.

* cited by examiner

*Primary Examiner* — Kris Rhu
(74) *Attorney, Agent, or Firm* — Jason Far-hadian

(57) ABSTRACT

A method for enhancing synchronization coverage for a logic code is provided. The method comprises tracking whether one or more code sections in the logic code are blocked by at least another code section in the logic code, or whether one or more code sections in the logic code are blocking at least another code section in the logic code, during one or more test runs; and including one or more delay mechanisms in the logic code to introduce a delay in execution of a first code section in the logic code, wherein length of introduced delay is dependent on whether the first code section was blocked by a second code section or whether the first code section was blocking the second code section.

8 Claims, 8 Drawing Sheets

FIG. 3D

After lock acquisition → [Always add delay noise] → ACQUIRED LOCK

SYNCHRONIZATION COVERAGE IN LOGIC CODE

CROSS-REFERENCE TO RELATED APPLICATION

This application is a continuation application of U.S. patent application Ser. No. 12/636,795 entitled, "IMPROVED SYNCHRONIZATION COVERAGE IN LOGIC CODE", filed on Dec. 14, 2009 and is assigned to the same assignee in the present application, contents of which are incorporated by reference herein in its entirety.

TECHNICAL FIELD

The claimed subject matter relates generally to testing logic code written for execution on computing systems and, more particularly, to improving synchronization coverage in program code in a multiprocessing environment.

BACKGROUND

Testing logic code written for execution on a computing system is a critical step in detecting and exposing potential errors during software development. Most existing techniques mainly focus on testing the sequential execution aspects of a code under test. Such techniques cannot effectively address synchronization coverage which is used to detect potential conflicts that may arise if the concurrent execution of different sections of the code results in an attempt to access the same resource at the same time.

In this context, synchronization refers to the use of a lock mechanism on a resource to prevent two or more code sections from accessing the same resource at the same time. In parallel processing environments, execution of a first code section may result in initiation of a lock on a common resource. In such a case, a second concurrently running code section will be blocked from locking or accessing that resource. As such, the first code section is deemed as blocking the second code section, and the second code section is deemed as being blocked by the first code section.

When code sections in a program code are tested for synchronization coverage, it is desirable to determine the different scenarios under which different code sections are either blocked or blocking. Generally, there is no guaranty that running a synchronization test on the program code multiple times will result in detecting additional code sections that are either blocked or blocking. In other words, multiple test runs, in many instances, do not result in better synchronization coverage.

SUMMARY

For purposes of summarizing, certain aspects, advantages, and novel features have been described herein. It is to be understood that not all such advantages may be achieved in accordance with any one particular embodiment. Thus, the claimed subject matter may be embodied or carried out in a manner that achieves or optimizes one advantage or group of advantages without achieving all advantages as may be taught or suggested herein.

In accordance with one embodiment, a method for enhancing synchronization coverage for a logic code is provided. The method comprises tracking whether one or more code sections in the logic code are blocked by at least another code section in the logic code, or whether one or more code section in the logic code are blocking at least another code section in the logic code, during one or more test runs; and including one or more delay mechanisms in the logic code to introduce a delay in execution of a first code section in the logic code, wherein length of introduced delay is dependent on whether the first code section was blocked by a second code section or whether the first code section was blocking the second code section.

In accordance with another embodiment, a system comprising one or more logic units is provided. The one or more logic units are configured to perform the functions and operations associated with the above-disclosed methods. In accordance with yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The claimed subject matter is not, however, limited to any particular embodiment disclosed.

BRIEF DESCRIPTION OF THE DRAWINGS

Embodiments of the claimed subject matter are understood by referring to the figures in the attached drawings, as provided below.

FIGS. 3A-3D illustrate exemplary delay introduction scenarios for the purpose of improving synchronization coverage in a program code under test, in accordance with one embodiment.

Features, elements, and aspects that are referenced by the same numerals in different figures represent the same, equivalent, or similar features, elements, or aspects, in accordance with one or more embodiments.

DETAILED DESCRIPTION OF EXEMPLARY EMBODIMENTS

In the following, numerous specific details are set forth to provide a thorough description of various embodiments of the claimed subject matter. Certain embodiments may be practiced without these specific details or with some variations in detail. In some instances, certain features are described in less detail so as not to obscure other aspects of the disclosed embodiments. The level of detail associated with each of the elements or features should not be construed to qualify the novelty or importance of one feature over the others.

Figure 1:
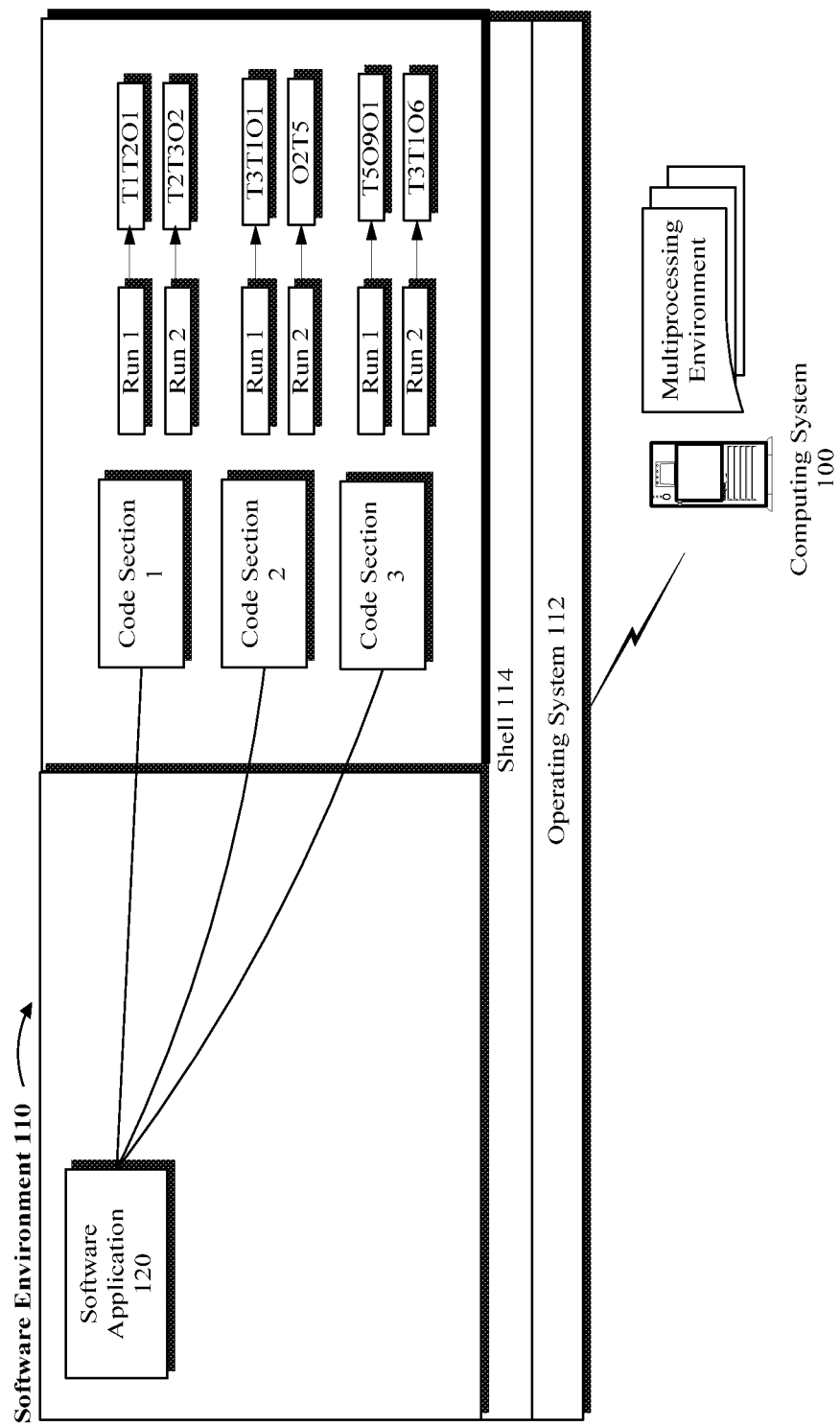
FIG. 1 illustrates an exemplary software environment for testing synchronization coverage for a logic code, in accordance with one or more embodiments.

Referring to FIG. 1, an exemplary runtime environment illustrated as software environment 110 is provided. Software environment 110 comprises an operating system 112 having a shell 114 loaded onto a computing system 100. In accordance with one aspect of the invention, software environment 110 supports a multiprocessing environment in which a software application 120 may be executed on top of operating system 112 for the purpose of testing a logic code (not shown) for synchronization coverage.

Multiprocessing, also commonly referred to multithreading, refers to the parallel execution of multiple processes or threads. A thread represents a process that is originated from a section of a logic code (i.e., a code section). In a multiprocessing environment, the concurrent execution of multiple code sections may result in the respective threads or processes spawned from each code section to try to access a common resource, resulting in a potential access conflict, or leading to incorrect calculations or deadlocks. Synchronization mechanisms generally referred to as "locks" can be implemented to avoid such conflicts.

Software application 120 may be configured to execute a plurality of test runs to determine conflicts, errors, and deadlocks in a logic code under test. The logic code under test may be an executable code, software application, program code, or any other logic routine or system in which one or more locks may be taken on one or more resources in a multiprocessing environment. A resource may be a data file, data structure, an object with a certain utility, an input or output device, or any other form of resource that may be commonly shared and accessed in a computing environment.

Figure 2:
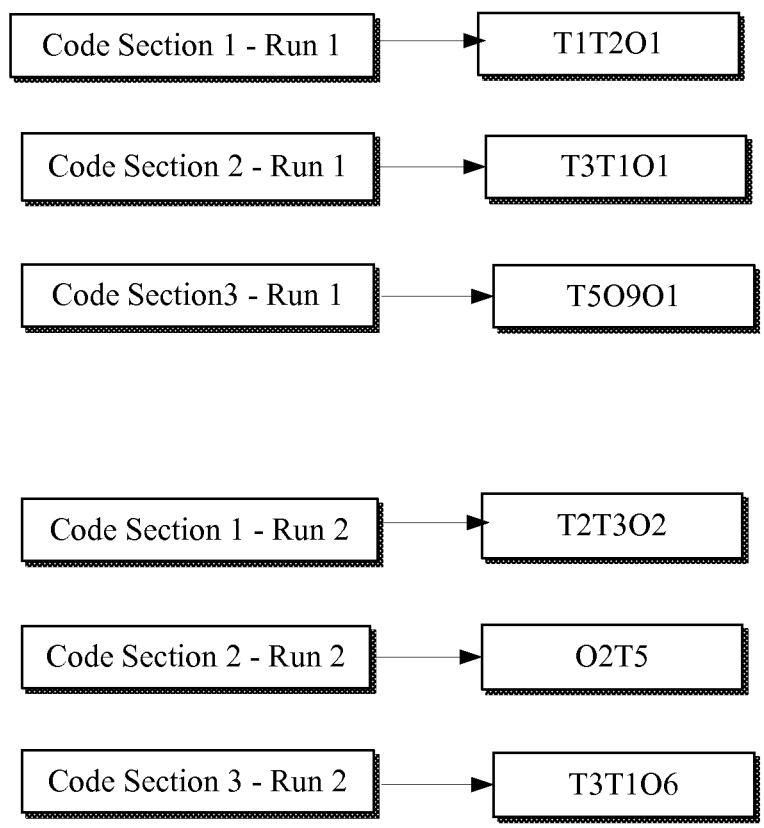
FIG. 2 is a block diagram of exemplary test runs of different code sections in a program code under test, in accordance with one embodiment.

Several test runs may be used to identify error or deadlock potentials among different code sections, and to produce a history for locks associated with each code section. As shown in FIGS. 1 and 2, for example, code sections 1, 2 and 3 may be executed concurrently. During the first execution (i.e., the first run) code section 1 may lock table 1 (T1) and table 2 (T2) prior to locking a first object (O1), for example. The lock history of the resources accessed by code section 1 may be represented by 'T1T2O1', for example. As shown, the lock history for different code sections (e.g., code section 2, code section 3, etc.) may be respectively represented by 'T3T1O1' and 'T5O9O1', for example.

Referring to FIG. 2, the lock history for different code sections during different runs is illustrated. In the exemplary diagram of FIG. 2, one can expect the possibility that during the first run, for example, code section 1 may block code sections 2 and 3 from accessing O1. Or referring to the second example run, code section 1 may block code section 2 from accessing O2, and further code section 1 may block code section 3 from accessing T3, for example, depending on the time each code section attempts to access a resource. Computer implemented testing tools or other verification mechanisms may be utilized to execute several test instances to cover the above exemplary conflicts for different code sections. Desirably, an optimal result for synchronization coverage is achieved when most or all the possible code section conflicts are tested.

In the above examples, the optimal results may include the identification of execution scenarios in which, for example, code section 1 is both blocked during one or more runs and blocking during one or more runs when accessing O1, and identification of the particular circumstances leading to such blockings. Consider an exemplary test run in which both code section 1 and code section 2 may want to access O1. It would be desirable to determine whether the two code sections were blocked or blocking at O1. If the test results indicate that, for example, code section 1 was blocked by code section 2 but there is no test results indicating code section 2 was blocked by code section 1, there is likely a deficiency in synchronization coverage.

In some embodiments, to achieve better synchronization coverage, delays in execution of predetermined or randomly selected code sections are introduced with the expectation that the introduction of said delays will increase the likelihood that different code sections may become blocked or blocking. In certain instances, however, even using a delay technique, the synchronization coverage may not be improved or achieved in a meaningful way, unless a large number of test runs are performed at substantial cost.

In one implementation, to improve and accelerate the synchronization coverage, special coverage test instruments may be used to introduce more meaningful delay periods in execution of selected code sections. Depending on implementation or the purpose of verification, the delay periods may be introduced either before, during or after a code section is executed to increase the chance that the execution of the code section during a test run would result in additional conflicts being detected. ConTest is an advanced testing solution from International Business Machines IBM® that may be utilized, in an exemplary embodiment, to expose and eliminate concurrency-related errors by systematically scheduling delays in the execution of different code sections.

As provided in further detail below, in one or more embodiments, pre-lock and post-lock delays may be introduced to identify the blocking and blocked code sections. In one implementation, pre-lock delays are eliminated once identified code sections are blocked by other code section.

In another implementation, post-lock delays are eliminated once the identified threads successfully block other threads. In some embodiments, the testing instruments may be utilized to 'adjust the probability' of injecting delays, instead of 'introducing or eliminating' delays. In such an implementation, the probability may be any function of the coverage state.

It is noteworthy that the methods introduced here can be used either alone or in combination to identify one or more access conflict scenarios in a logic code under test. Such methods may be utilized either individually or in association with different code section attributes to help analyze, detect and expose potential conflicts and deadlocks in, for example, a multithreaded logic code. Accordingly, in certain embodiments, software application 120 may be implemented to produce a synchronization coverage model for the logic code under test based on one or more of the methods disclosed herein.

Referring to FIGS. 3A-3D, in one embodiment, a logic code under test may be instrumented so as to introduce a delay in the execution of one or more code sections in the logic code and to add code that keeps track of blocked or blocking delays. Instrumentation within this context refers to placing instructions in selected sections of the logic code under test to generate an output or report that provides the values assigned to certain variables or objects of interest, as the logic code is executed. The generated values are used to determine code coverage and potential conflicts.

In one embodiment, synchronization coverage for a logic code under test may be improved and optimized by way of introducing noise (e.g., a delay in execution of a code section) that affects interleavings (e.g., execution of code sections identified as having potential conflicts) in the code. Introduction of such noise is most effective when a condition is detected which is expected to contribute to better synchronization coverage for a particular code section.

In one implementation, for example, delays that are dependent on the coverage state may be introduced based on the result generated from a tracing model for code sections that held a lock on one or more common resources. To accomplish the above, delays in execution may be introduced either before or after acquiring or releasing a locked resource where deemed appropriate.

Figure 3A:
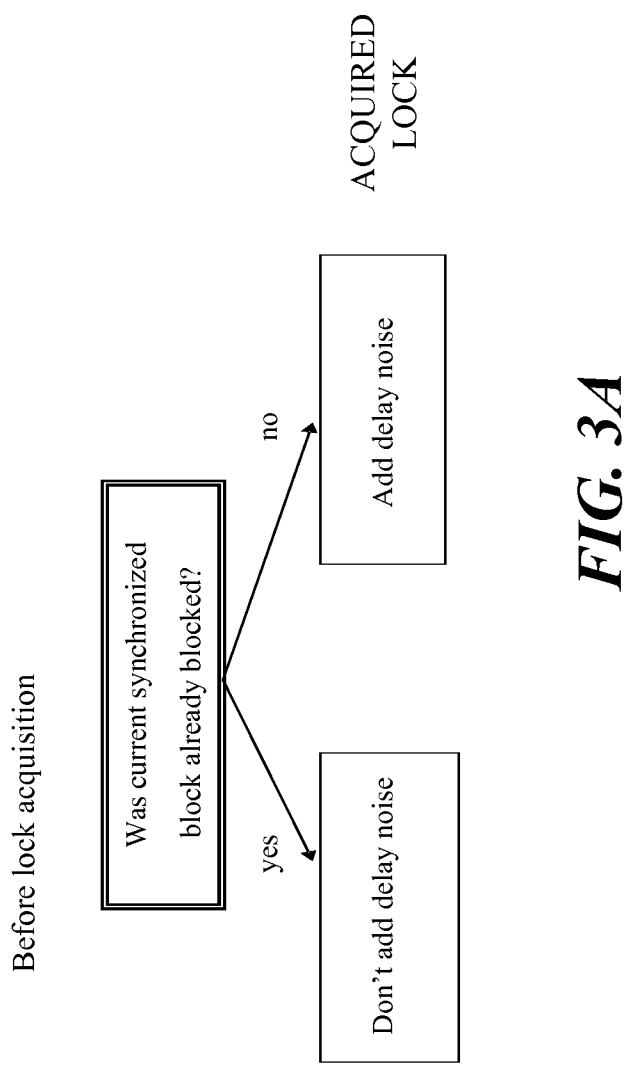

Referring to FIG. 3A, in one implementation, for example, if prior to lock acquisition by a first code section, a coverage record indicates that the first code section was already blocked by a second code section at a particular resource, there may be no need to delay the execution of the first code section before trying to acquire a lock on that resource. Such knowledge eliminates the need for introduction of additional delays in execution of the first code section associated with the identified resource.

Figure 3B:
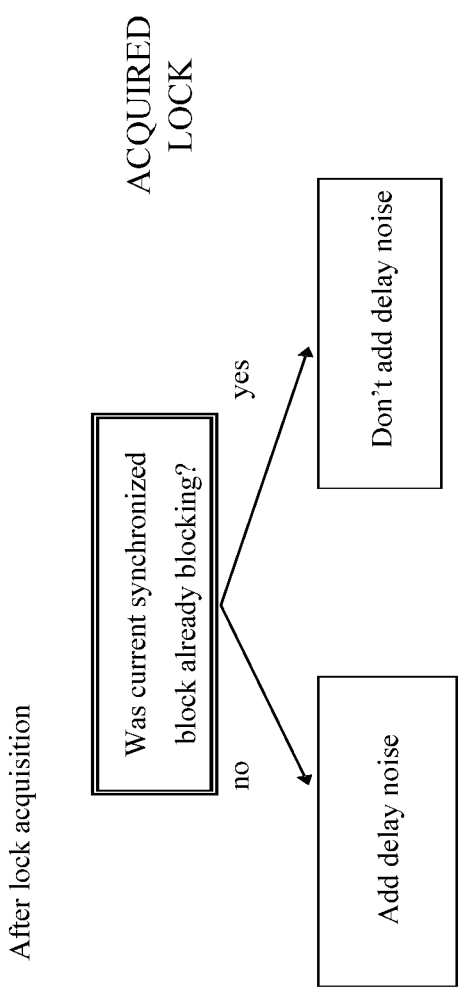

As shown in FIG. 3B, in some embodiments, delay noise may be added after a first code section has acquired a lock on a resource associated with a second code section. Delays in code execution may be introduced (e.g., forced) at particular code sections to enhance code coverage by increasing the probability of meeting conditions that have not yet been observed during regular testing of the logic code. For example, instead of forcing delays in randomly selected code sections, using analysis of the accumulated coverage records, delays may be introduced or forced in sections of the logic code that have a higher potential of creating a conflict.

Figure 3C:
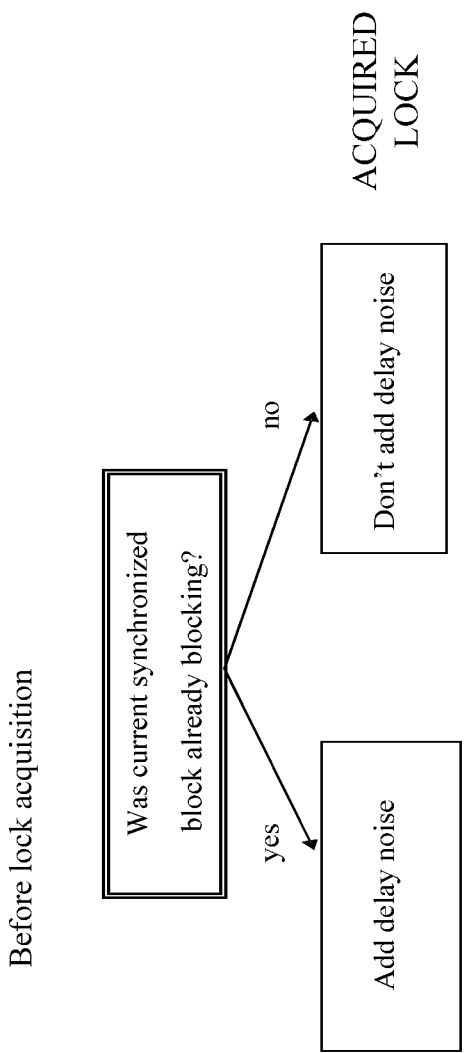

Referring to FIG. 3C, in one exemplary scenario, before a lock is taken by a first code section, a determination is made whether the code section synchronized by the lock was previously blocking. If so, the execution of the first code section is delayed for some period. This increases the chance that a second code section will enter another code section that is synchronized by this lock and was not previously blocking and block the first code section when its delay period ends, if the execution of the target thread is further delayed.

Referring to FIG. 3D, in another exemplary scenario, after a lock is taken on a resource by a first code section, the execution of the first code section is delayed for a period of time, regardless of its coverage state. This process increases the chance that other code sections that are synchronized by this lock (e.g., other code sections that intend to lock the same resource) will become blocked by the first code section, and that the delayed code section (e.g., the second/the target code section) would become blocking.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 4A:
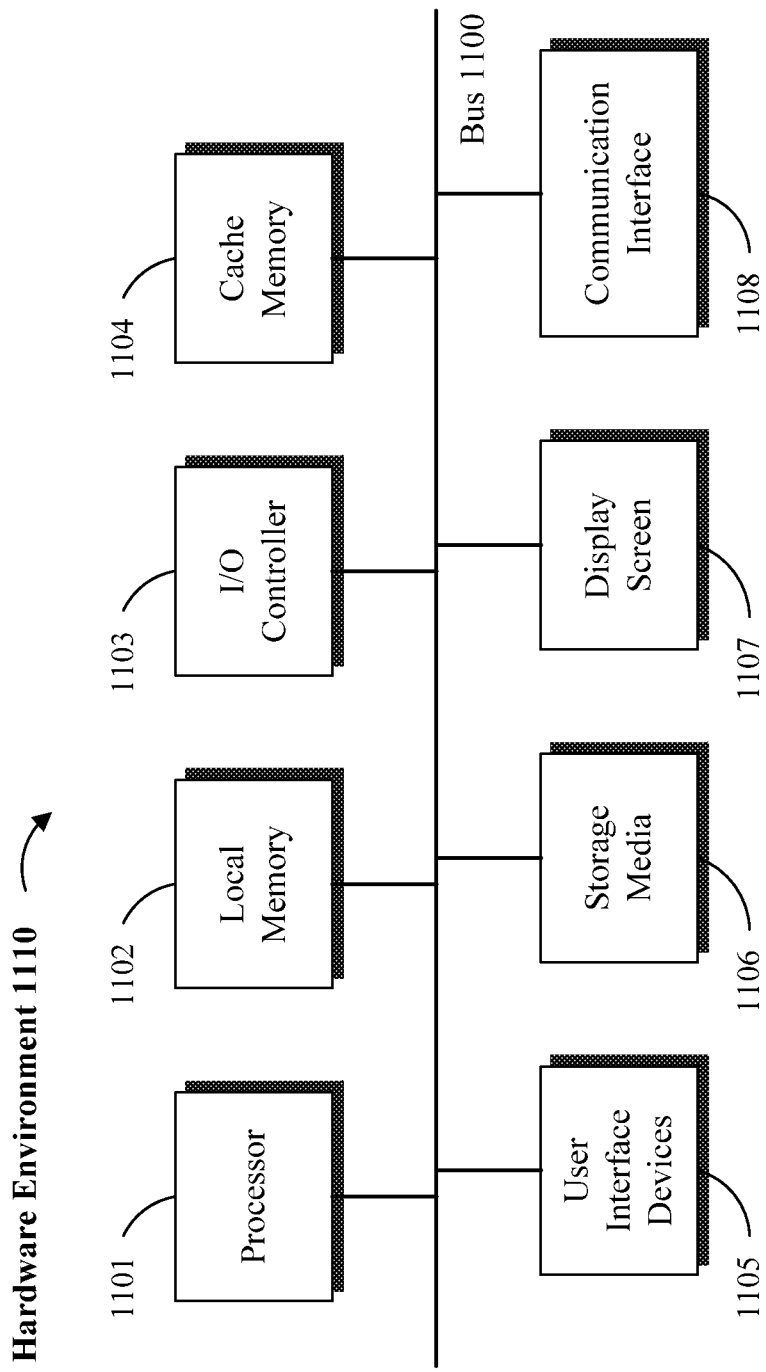
FIGS. 4A and 4B are block diagrams of hardware and software environments in which a system of the present invention may operate, in accordance with one or more embodiments.
Figure 4B:
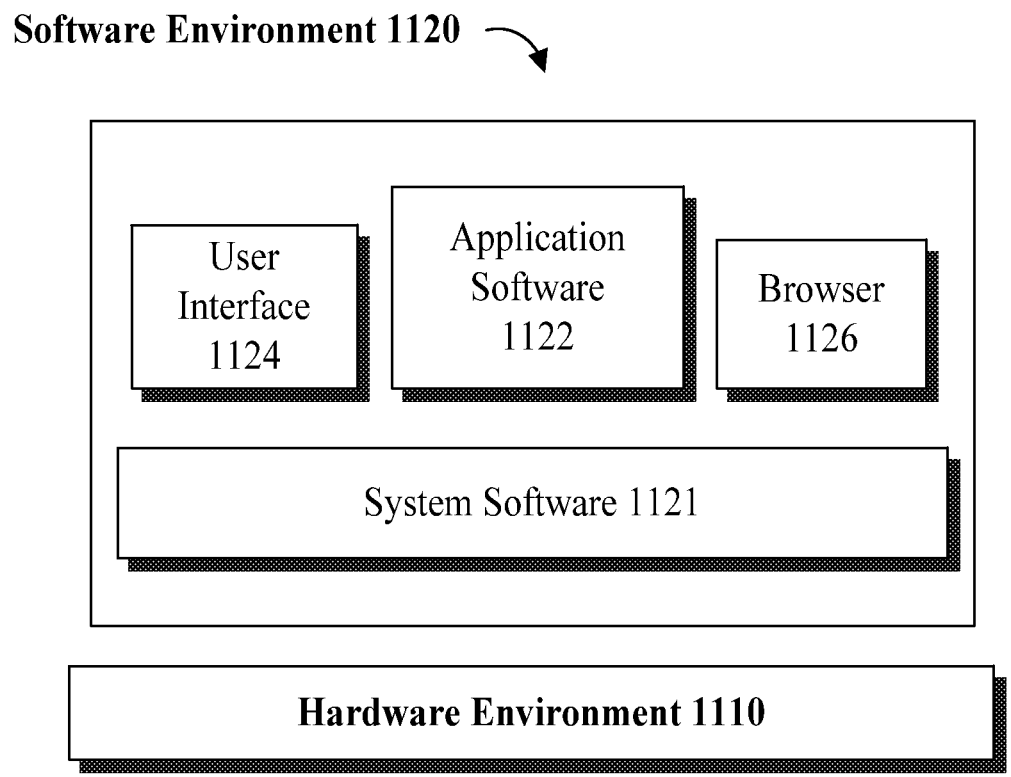

Referring to FIGS. 4A and 4B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 4A, the application software and logic code disclosed herein may be implemented in the form of computer readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other computer-usable or computer readable media. Within the context of this disclosure, a computer usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a computer-usable or computer readable storage medium that provides program code for use by, or in connection with, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable storage medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A computer implemented method for enhancing synchronization coverage for a logic code, the method comprising:

tracking, using a computing mechanism, whether one or more code sections in the logic code are blocked by at least another code section in the logic code, or whether one or more code sections in the logic code are blocking at least another code section in the logic code, during one or more test runs; and including one or more delay mechanisms in the logic code to introduce a delay in execution of a first code section in the logic code, wherein length of introduced delay is dependent on whether the first code section was blocked by a second code section or whether the first code section was blocking the second code section, wherein the delay is introduced before acquiring a lock on the first code section, and wherein the introduced delay is less than a threshold time period, if the first code section was blocked by the second code section prior to acquiring the lock on the first code section.

2. The method of claim 1, wherein the length of the introduced delay is essentially zero.

3. The method of claim 1, wherein the delay is introduced after acquiring a lock on the first code section.

4. The method of claim 3, wherein the introduced delay is less than a threshold time period, if the first code section was blocking the second code section prior to acquiring the lock on the first code section.

5. The method of claim 3, wherein the introduced delay is longer than a threshold time period, if the first code section has never blocked another code section.

6. The method of claim 3, wherein the introduced delay is longer than a threshold time period, if the first code section was blocked by the second code section prior to acquiring a lock on the first code section.

7. The method of claim 1, wherein the introduced delay is longer than a threshold time period, if the first code section has never been blocked by another code section.

8. The method of claim 1, wherein the introduced delay is longer than a threshold time period, if the first code section was blocking the second code section prior to acquiring a lock on the first code section.

\* \* \* \* \*